Inventors
Fernan O. Conill
and
Michel de Lézinier
per
Attorney.

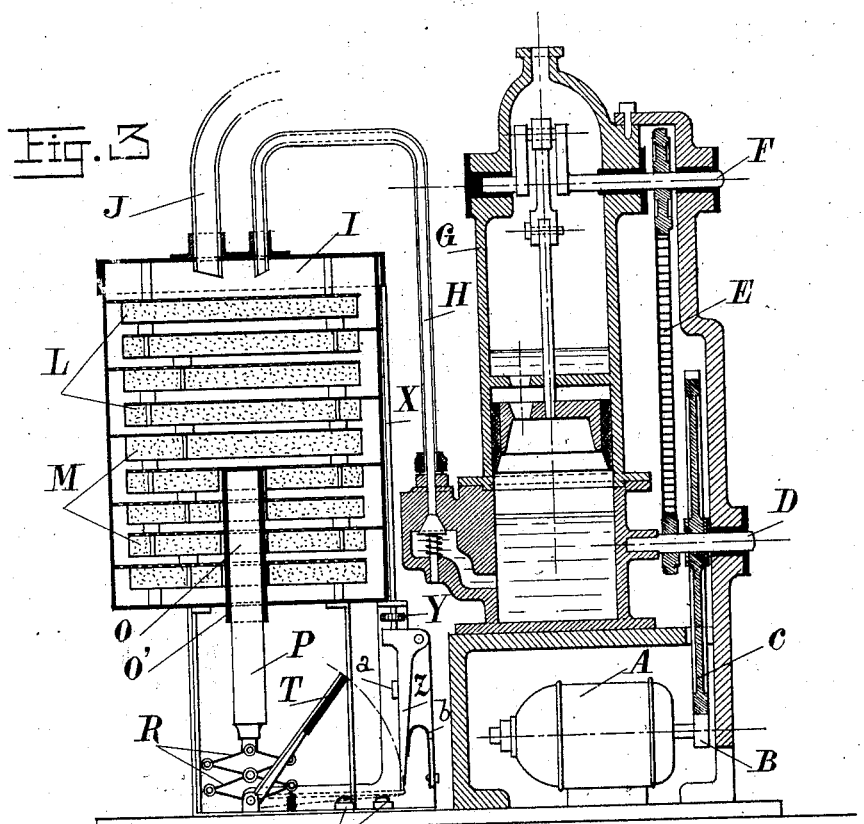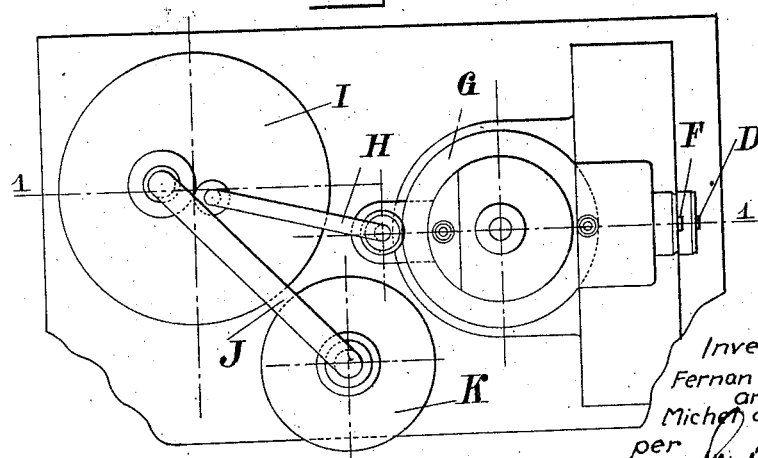

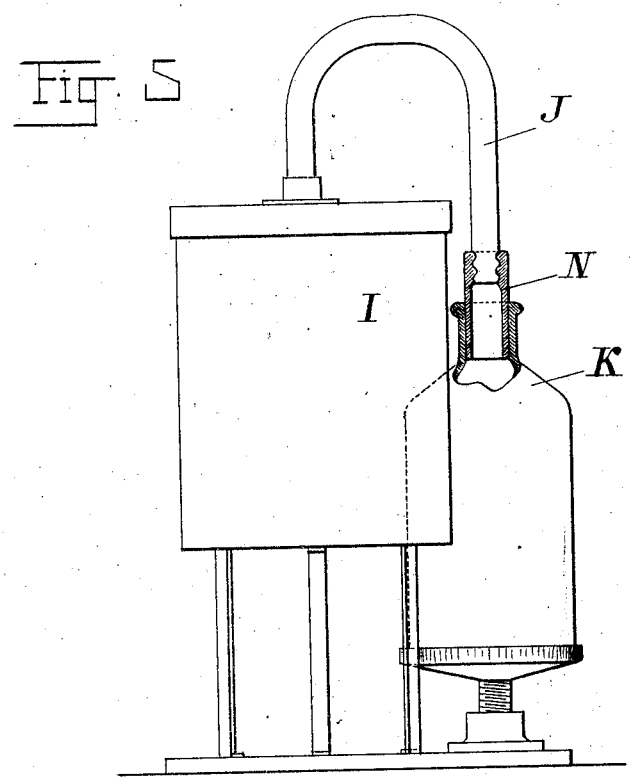
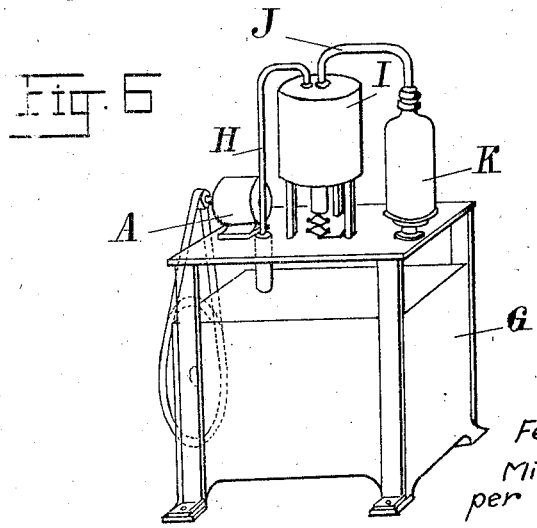

Patented Oct. 27, 1925.

1,559,223

UNITED STATES PATENT OFFICE.

FERNAN O. CONILL AND MICHEL DE LÉZINIER, OF MARSEILLES, FRANCE.

DOMESTIC REFRIGERATING APPARATUS

Application filed August 17, 1922. Serial No. 582,452.

*To all whom it may concern:*

Be it known that we, FERNAN O. CONILL and MICHEL DE LÉZINIER, citizens of the Republic of Cuba and of the Republic of France, respectively, residing at Marseilles, France, have invented certain new and useful Improvements in Domestic Refrigerating Apparatus, of which the following is a specification.

This invention relates to an electrically operated domestic refrigerating apparatus for the production of ice and thoroughly cooled water. The apparatus is simple and economical in its construction and operation and no poisonous or other objectionable materials are employed.

The improved apparatus is based on the known principle according to which water is evaporated, without heating, by the creation of a vacuum in the water container whilst the temperature falls in proportion with the evaporation and large volumes of vapors are drawn off and, in condensing, very soon prevent the operation of the vacuum pump. This objection has heretofore been met by absorbing the vapors by sulphuric acid contained in a large receptacle and thoroughly agitated during the operation. As the sulphuric acid absorbs great quantities of water, however, it is soon rendered unserviceable and must be replaced, thus causing considerable expense and necessitating a very dangerous operation that only skilled persons can perform.

In the apparatus according to the present invention the vapors produced by the evaporation are absorbed by a substance that requires no replacement, and when the absorbing capacity of this substance falls the restablishment of the full absorbing capacity may be effected by means of a movable electric heating resistance which causes sufficient heat to effect the evaporation of the water vapors absorbed by the material so that the apparatus may conveniently be put in readiness for use without the necessity of taking away and of replacing the vapor absorbing material, the pump remaining idle during this operation.

This result is obtained with the apparatus illustrated by way of example in the accompanying drawings in which:

Fig. 3 is a vertical cross section on line 1—1 of Fig. 4, showing the internal parts of the apparatus.

Fig. 4 shows in plan a general view of the apparatus.

Fig. 5 shows the vapor absorbing chamber and the bottle or container for the water to be cooled, with parts in section.

Fig. 6 is a perspective view of a slightly modified form of the apparatus in which the reciprocating pump is replaced by a rotary oil pump, the casing of which forms the base of the apparatus.

Throughout the drawings the same reference characters indicate the same or corresponding parts.

The electric motor A drives, by means of the pinion B, a toothed wheel C fixed upon shaft D revolving at a speed equal to one tenth the revolving speed of the motor. The shaft D drives the shaft F by means of a chain E, the shaft F revolving at a speed equal to one-half the revolving speed of shaft D. The shaft F carries the crank connected in any usual manner with the piston of the oil pump G so as to avoid dead spaces, the pump being also supplied with the usual back pressure, suction and delivery valves. The suction pipe H connects the pump G with the receptacle or chamber I in which the vacuum is to be created, said chamber I being connected by means of a pipe J with the bottle K containing the water to be cooled.

The chamber I contains a set of plates L provided each with retaining rims of galvanized iron or other suitable material; the plates L being superposed and each of them being covered by a perforated sheet metal lid M. These sheets M are provided with abutments and clamps serving to ensure the centering of the plates L and to keep said plates at their proper distance apart. The said plates L carry silicagel (colloidal silex), but this silicagel may be replaced by any other suitable material capable of absorbing water vapors and subsequently discharging them under the action of heat, such materials being for example zinc chloride with potash and mixed with powdered pumice stone to increase the absorbing surface, or magnesium chloride.

The end of the pipe J connected to the bottle K is formed with a rubber pipe N which fits into the mouth of the bottle K (Fig. 5), so as to avoid leakages; and the bottle K is mounted on a movable base carrying a threaded shaft which may be rotated to ensure a tight gripping on the bottle or to release the rubber pipe N from the bottle mouth.

Figure 1:
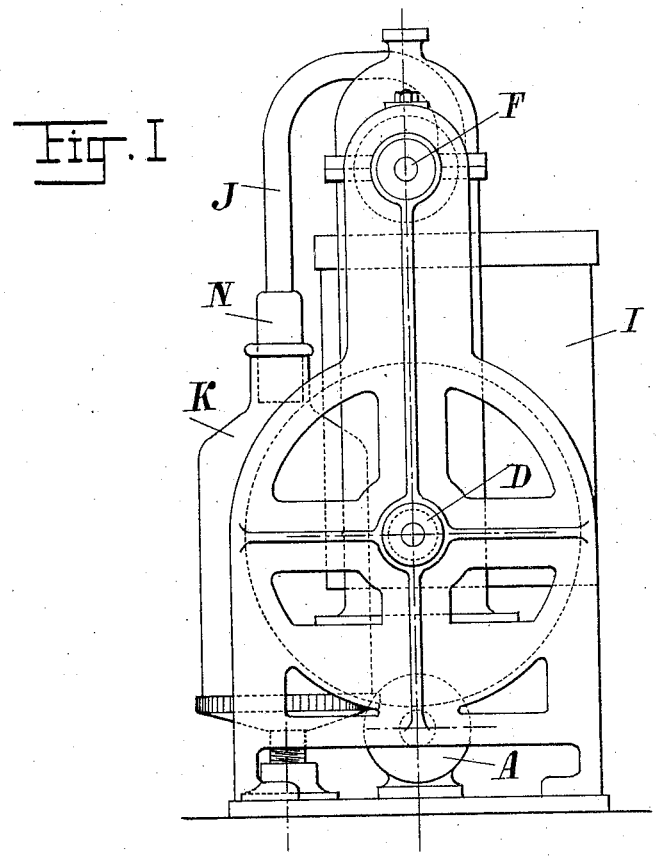
Fig. 1 is a front view of the casing enclosing the apparatus.
Figure 2:
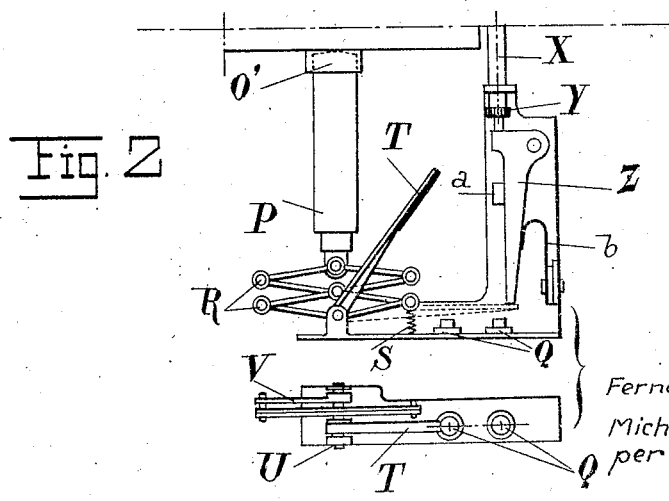
Fig. 2 shows on a larger scale a front view and plan view respectively, of the movable electric heating resistance.

In the lower part of the chamber I the tube O is soldered, the diameter of this tube being in proportion with the capacity of the chamber I, and a short length O' of the tube protrudes downwards and acts as a guide for an electric heating resistance P (Fig. 3) which is adapted to slide vertically within the tube O; toggle links R being provided to allow this latter movement whilst a tension spring S (Fig. 2) ensures and assists the downward movement of the heating resistance P.

This electric heating device works in the following way:—

When it is desired to dry out the vapor absorbing substance the pump is left idle and the pivoted arm T is lowered by hand and towards the end of its downward movement the free extremity thereof comes in contact with the spring contacts Q, two in number; one of these contacts being connected to the electric feed line; and the end portion of lever T is made of conducting material and thus allows the current to flow to the other spring contact which is connected to the heating resistance. In its downward movement the arm T lifts the lever V (Fig. 2) fixed on the shaft U; and the free end of lever V is connected to the toggle links R carrying the resistance P so that this movement raises the resistance within the tube O. The resistance is retained in this raised position by the engagement of the free end of the rod T under the longer arm of the spring controlled lever Z. The electric current flows through the resistance and produces the heat which is diffused in the interior of the chamber I and causes the evaporation of the water absorbed by the colloidal silex, zinc chloride or other suitable substance.

At the outside of the chamber I and in close proximity thereto a vertical zinc rod X is provided, said zinc rod receiving the radiated heat of the chamber. This rod is fixed at one of its extremities so that its expansion due to the heat of the chamber displaces the other end which is provided with the adjusting screw Y and bears upon the shorter arm of the aforesaid lever Z causing this lever to swing through an angle sufficient to cause the disengagement of the longer arm of the lever Z from above the rod T, which latter then swings rapidly upward under the influence of the weight of the heating resistance P and of the tension of said spring S and, in this movement the electric connection between the two spring contacts Q is interrupted so that the resistance P is allowed to cool after being automatically withdrawn out of the tube O.

A thin metal sheet, conveniently bent and perforated carries the resistance control mechanism; a stop piece a and the spring b determine the position of the control lever Z which magnifies the elongation of the zinc rod X.

So as not to complicate the drawings the electric connections are omitted; they are such that in closing the circuit between the spring contacts Q by means of the arm T, the supply of current to the motor A may be discontinued.

More particularly the operation of the apparatus is as follows:

The pipe J with its part N is coupled to the thermos bottle K which is filled with water, the part N being tightened into the mouth of the bottle by rotating the threaded shaft beneath the bottle. The pump G is then started and the water contained in the bottle K is cooled to freezing point in a very short time.

This operation can be repeated again and again until it becomes necessary to restore the absorbing material to its original condition. For this purpose the heating resistance is put into operation by depressing the arm T and the apparatus is left to itself, that is to say, no water is cooled.

When the required temperature is attained and all the absorbed water is evaporated from the material in the chamber I the automatic device cuts off the current and withdraws the resistance P; the apparatus is then again ready for operation and the number of successive cycles of operations is unlimited.

It is understood that the apparatus may be used in all cases in which a solution in water of a substance not dissociating at a temperature of 0° is to be concentrated.

We claim:—

1. A domestic refrigerating apparatus for the production of ice and thoroughly cooled water, comprising a vertical cylindrical vacuum chamber provided with a plurality of coaxially disposed and superposed plate shaped receptacles containing permanently solid water vapor absorbing material, a vacuum pump for creating a vacuum in the said chamber, a pump driving gears, a bottle containing the water to be cooled, means to support and tightly connect the said bottle with the said vacuum chamber, an electric heating element for heating the chamber and thus drying the vapor absorbing material contained therein, and means for automatically arresting the drying operation.

2. A domestic refrigerating apparatus for the production of ice and thoroughly cooled water, comprising a vacuum chamber, permanently solid vapor absorbing material within said chamber, a bottle for the water to be cooled, a connection between the chamber and the bottle, pump mechanism for creating a vacuum within said chamber and bottle, a slidable electric resistance for heating said chamber to dry said material, a tube for receiving said resistance closed at the upper extremity and fixed to the bottom of the vacuum chamber, said tube being coaxial with the chamber, and means for automatically arresting the drying operation.

3. A domestic refrigerating apparatus for the production of ice and thoroughly cooled water, comprising a vacuum chamber, a water containing bottle connected to the chamber, vacuum pump mechanism connected to the container, a movable electric heating resistance for drying said chamber, toggle links connected to the lower extremity of the resistance, a hand operated arm for controlling the operation of the said toggles and closing the electric circuit of the resistance when in its down position and retaining the resistance in its lifted position whilst the resistance is moved downwards as soon as the arm swings upwards.

In testimony whereof we affix our signatures.

FERNAN O. CONILL.
MICHEL DE LÉZINIER.